United States Patent
Watarai

(10) Patent No.: US 8,381,884 B2
(45) Date of Patent: Feb. 26, 2013

(54) BICYCLE BRAKING SYSTEM

(75) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 1143 days.

(21) Appl. No.: 12/267,748

(22) Filed: Nov. 10, 2008

(65) Prior Publication Data

US 2010/0116598 A1  May 13, 2010

(51) Int. Cl.
*B62L 3/00* (2006.01)

(52) U.S. Cl. ............... 188/24.22; 188/2 D; 188/18 A; 188/24.12

(58) Field of Classification Search ........... 188/24.22, 188/24.12, 24.14, 344, 18 A, 2 D
See application file for complete search history.

(56) References Cited

U.S. PATENT DOCUMENTS

| | | | |
|---|---|---|---|
| 4,862,999 A | 9/1989 | Rakover | |
| 4,974,704 A * | 12/1990 | Miller et al. | 188/24.14 |
| 5,291,972 A * | 3/1994 | Griffith | 188/24.18 |
| 6,615,955 B2 * | 9/2003 | Jakovljevic | 188/24.14 |
| 6,874,592 B2 * | 4/2005 | Yokotani et al. | 180/206.2 |
| 2005/0000756 A1 * | 1/2005 | Biria | 188/26 |
| 2009/0302565 A1 * | 12/2009 | Ouellet | 280/63 |
| 2009/0322145 A1 * | 12/2009 | Rinard | 301/58 |

FOREIGN PATENT DOCUMENTS

| | | |
|---|---|---|
| CH | 146426 A | 7/1931 |
| DE | 195 30 628 A1 | 5/1996 |
| DE | 296 07 644 U1 | 8/1996 |
| DE | 298 11 255 U1 | 10/1998 |
| DE | 102 50 645 A1 | 7/2003 |
| FR | 2673594 A1 | 9/1992 |
| JP | 2001-030974 A | 2/2001 |
| JP | 3439888 B2 | 6/2003 |
| JP | 2004-149001 A | 5/2004 |

OTHER PUBLICATIONS

German Office Action of corresponding DE Application No. 10 2009 021 497.6 dated Jun. 8, 2011.

* cited by examiner

*Primary Examiner* — Robert A Siconolfi
*Assistant Examiner* — Mariano Sy
(74) *Attorney, Agent, or Firm* — Global IP Counselors, LLP

(57) ABSTRACT

A bicycle braking system is basically provided with a bicycle braking device, a supplementary brake operating device and a brake maintaining arrangement. The bicycle braking device is movably between a non-brake applying position and a brake applying position for applying a braking force. The supplementary brake operating device is operatively coupled to operate the bicycle braking device. The supplementary brake operating device includes a rider operating arrangement that is operable by a rider between a non-braking position and at least one predetermined braking position. The brake maintaining arrangement is configured and arranged to hold the bicycle braking device in the brake applying position in response to movement of the rider operating arrangement to the predetermined braking position such that the braking force of the bicycle braking device is continually and consistently applied.

12 Claims, 12 Drawing Sheets

BICYCLE BRAKING SYSTEM

BACKGROUND OF THE INVENTION

1. Field of the Invention

This invention generally relates to a braking system for a bicycle. More specifically, the present invention relates to a bicycle braking system in which a braking force of a bicycle braking device can be continually and consistently applied.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the components for the bicycle to suit a particular need and/or desire of a rider.

Most bicycles are provided are typically provided with some kind of braking system. These braking systems can include, for example, hand operated brakes and foot operated brakes. The most common bicycle braking system includes a pair of hand operated brake levers that selectively operate a pair of braking force applying devices, respectively, in which one of the brake lever applies a braking force to the front wheel and the other one of the brake lever applies a braking force to the rear wheel. The actuation of the brake lever can be transmitted to the braking force applying device in a variety of ways. The most common method of connecting the brake lever to the braking force applying device is by using a cable. However, in recent years, hydraulic braking systems and electric braking systems have been used in bicycle. One common feature of all of these braking systems is that the braking force of the braking force applying device is only applied while the rider is operates the brake operating device (e.g., the brake lever). In other words, once the rider releases the brake operating device (e.g., the brake lever), the braking force of the braking force applying device stops. Thus, for example, when the rider is going down a steep hill, the rider needs to continuously hold the brake operating device (e.g., the brake lever) to continuously apply the braking force of the braking force applying device to the wheel.

In view of the above, it will be apparent to those skilled in the art from this disclosure that there exists a need for an improved braking system that can apply a continual and consistent braking force. This invention addresses this need in the art as well as other needs, which will become apparent to those skilled in the art from this disclosure.

SUMMARY OF THE INVENTION

One object of the present invention is to provide braking system that can apply a continual and consistent braking force.

The foregoing objects can basically be attained by providing a bicycle braking system that basically comprises a bicycle braking device, a supplementary brake operating device and a brake maintaining arrangement. The bicycle braking device is movably between a non-brake applying position and a brake applying position for applying a braking force. The supplementary brake operating device is operatively coupled to operate the bicycle braking device. The supplementary brake operating device includes a rider operating arrangement that is operable by a rider between a non-braking position and at least one predetermined braking position. The brake maintaining arrangement is configured and arranged to hold the bicycle braking device in the brake applying position in response to movement of the rider operating arrangement to the predetermined braking position such that the braking force of the bicycle braking device is continually and consistently applied.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
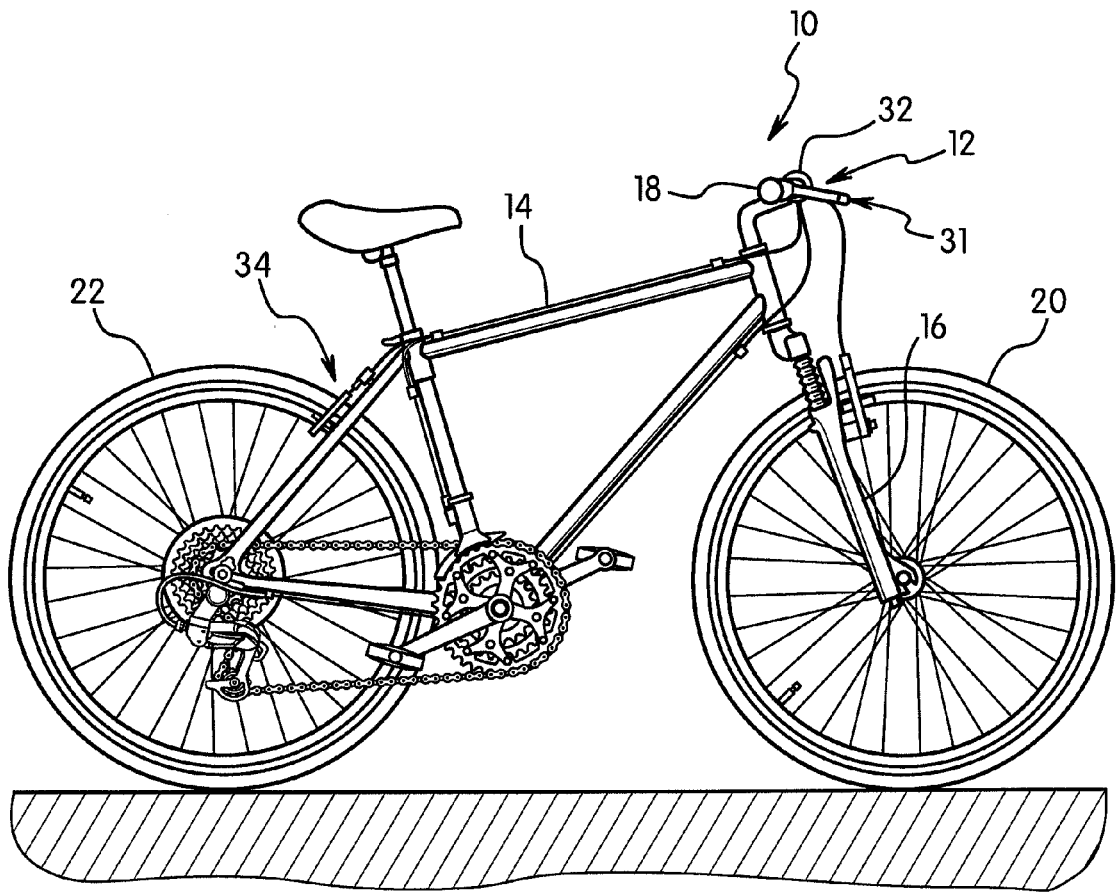
FIG. 1 is a side elevational view of a bicycle equipped with a bicycle braking system in accordance with a first embodiment.

Referring initially to FIG. 1, a bicycle 10 is illustrated that is equipped with a bicycle braking system 12 in accordance with a first embodiment. The bicycle 10 illustrated in FIG. 1 includes, among other things, a main frame 14, a front fork 16, a handlebar 18, a front wheel 20 and a rear wheel 22. The front fork 16 is pivotally attached to the head tube of the main frame 14. The handlebar 18 is fixedly attached to a steerer tube at the upper end of the front fork 16. The front wheel 20 is attached to a lower end of the front fork 16. The rear wheel 22 is attached to a rear end of the main frame 14.

Figure 2:
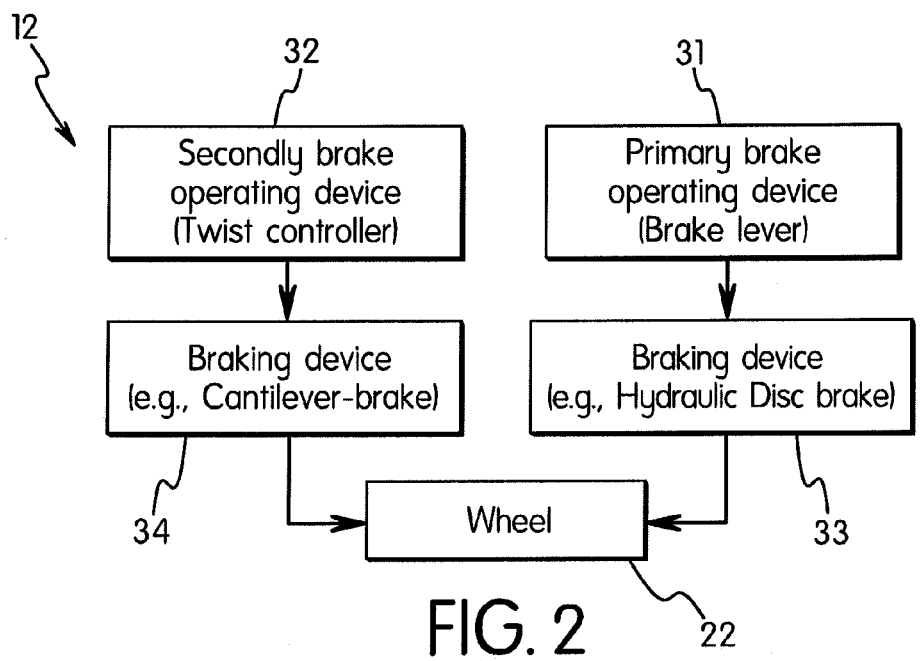
FIG. 2 is a block diagram of the bicycle braking system in accordance with the first embodiment.
Figure 3:
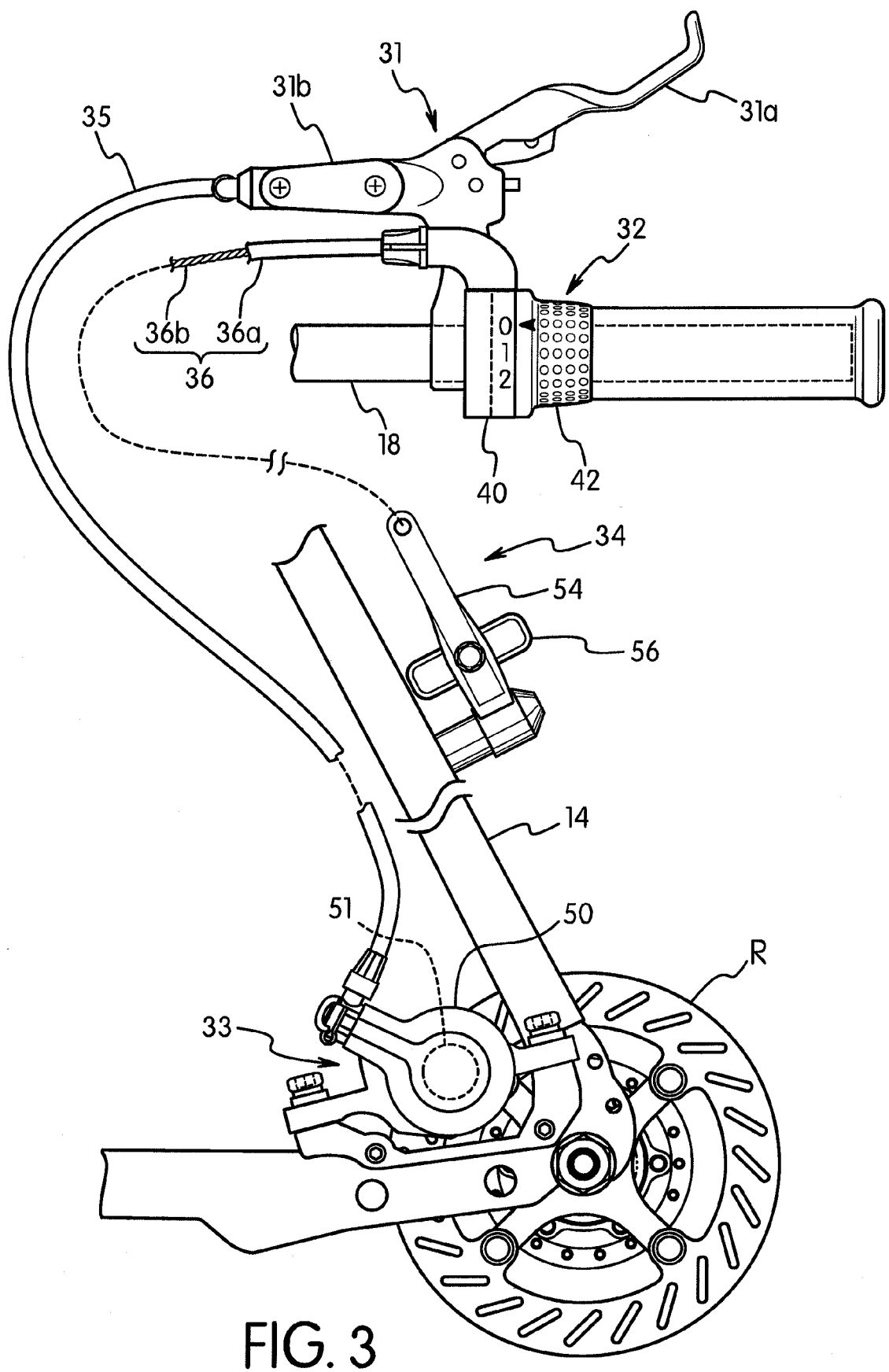
FIG. 3 is a diagrammatic view of the bicycle braking system in accordance with the first embodiment, showing primary and supplementary of brake operating devices coupled to the handlebar of the bicycle illustrated in FIG. 1, and showing primary and supplementary bicycle braking devices coupled to the frame of the bicycle.
Figure 4:
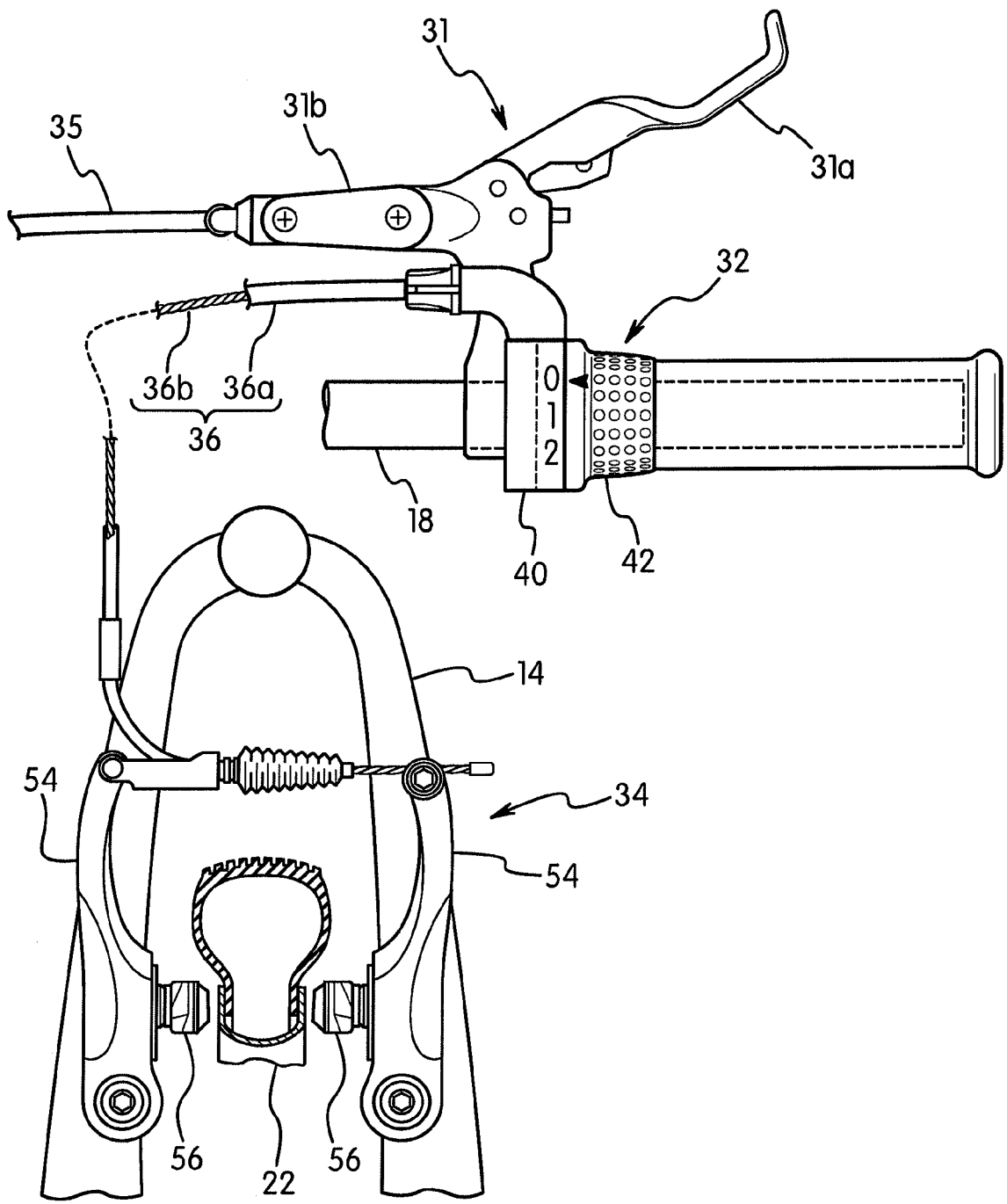
FIG. 4 is a diagrammatic view of the supplementary brake operating device in a non-braking position so that the supplementary bicycle braking device is in a brake applying position.

In this illustrated embodiment, as seen in FIGS. 2 and 3, the bicycle braking system 12 basically comprises a primary brake operating device 31, a supplementary brake operating device 32, a primary bicycle braking device 33 and a supplementary bicycle braking device 34. Here, the primary bicycle braking device 33 is a hydraulic disc brake and the supplementary bicycle braking device 34 is a cantilever type brake. The primary brake operating device 31 is operatively coupled to the primary bicycle braking device 33 to selectively move the primary bicycle braking device 33 between a non-brake applying position and a brake applying position for applying a braking force to the rear wheel 22. The supplementary bicycle braking device 34 is operatively coupled to the supplementary bicycle braking device 34 to selectively move the supplementary bicycle braking device 34 between a non-brake applying position and a brake applying position for applying a braking force to the rear wheel 22. Of course, the bicycle braking devices 33 and 34 can be arranged to both apply a braking force to the front wheel 20 upon operation of the primary brake operating device 31 and/or the supplementary brake operating device 32.

The primary brake operating device 31 only operates the primary bicycle braking device 33 so long as the rider holds the brake lever 31a of the primary brake operating device 31 in the braking applying or actuating position. Once the rider releases the primary brake operating device 31, the primary bicycle braking device 33 releases the braking force applied device to the rear wheel 22. On the other hand, once the rider operates the supplementary brake operating device 32 from a non-braking position to at least one predetermined braking position, the supplementary bicycle braking device 34 is held in a brake applying position for applying a braking force to the rear wheel 22 without the rider continuing to operate (e.g., apply an operating force) the supplementary brake operating device 32. The supplementary brake operating device 32 is designed such that a full braking force cannot be applied to the rear wheel 22. In other words, the predetermined braking positions of the supplementary brake operating device 32 are designed so that the rear wheel 22 cannot be locked up in either of the predetermined braking positions of the supplementary brake operating device 32.

The primary brake operating device 31 is a hydraulic brake operating device that includes a brake lever 31a that is pivotally mounted to a handlebar mounting portion 31b. The brake lever 31a is biased relative to the handlebar mounting portion 31b away from the handlebar 18 towards a non-braking applying position. When the brake lever 31a is pulled towards the handlebar 18, a brake applying position for apply a braking force. In particular, hydraulic fluid is forced down a hydraulic hose 35 that is connected between a hydraulic fluid reservoir in the handlebar mounting portion 31b and the primary bicycle braking device 33 to move a brake pad against a brake disc rotor R. The primary brake operating device 31 is a conventional hydraulic brake operating device that is well known in the bicycle art. Thus, for the sake of brevity, the primary brake operating device 31 will not be discussed and/or illustrated in detail herein.

The supplementary brake operating device 32 is a cable operating device that is mounted to the handlebar 18. The supplementary brake operating device 32 is a twist-grip type operating device that basically includes a mounting part 40, a winding member 41, an operating member 42, and an indexing mechanism 43. A supplementary brake cable 36 is operatively connected between the supplementary brake operating device 32 and the supplementary bicycle braking device 34. The supplementary brake cable 36 is a conventional Bowden control cable that has an outer casing 36a and an inner wire 36b that moves within the outer casing 36a to transmit a pulling force to the supplementary bicycle braking device 34 when the operating member 42 is twisted towards the handlebar 18. Free ends of the inner wire 36b extend out from opposite ends of the outer casing 36a such that one end of the inner wire 36b is connected to the winding member 41 of the supplementary brake operating device 32 and the other end of the inner wire 36b is connected the supplementary bicycle braking device 34.

The mounting part 40 is configured to be mounted to the handlebar 18. The winding member 41 is rotatably connected to the mounting part 40, and has an inner wire attachment structure 41a for attaching one end of the inner wire 36b. The operating member 42 is fixed to the winding member 41 so that they rotate together. The operating member 42 constitutes a rider operating arrangement that is operable by a rider between a non-braking position and at least one predetermined braking position. The indexing mechanism 43 is configured to rotatably support the winding member 41 and the operating member 42, and to position the operating member 42 and the winding member 41 with respect to the mounting part 40 at three indexing positions (e.g., one non-braking position and two braking positions). Thus, the indexing mechanism 43 constitutes a brake maintaining arrangement of the supplementary brake operating device 32 that is configured and arranged to hold the supplementary bicycle braking device 34 in the brake applying position in response to movement of the operating member 42 (i.e., the rider operating arrangement) to a predetermined braking position such that the braking force of the supplementary bicycle braking device 34 is continually and consistently applied. This continually and consistently applied braking force is maintained even after the releases the operating member 42.

The indexing mechanism 43 is operatively disposed between the mounting part 40 and the operating member 42 to hold the operating member 42 such that the supplementary bicycle braking device 34 is also held in one of a plurality of the predetermined braking positions via the inner wire 36b. Thus, the supplementary brake operating device 32 is configured to pull and release the inner wire 36b of the Bowden cable 36 so as to move the inner wire 36b among the plurality of indexing positions (e.g., one non-brake applying positions and two brake applying positions) in accordance with the rotational position of the operating member 42. In this illustrated embodiment, the brake maintaining arrangement (e.g., the indexing mechanism 43) of the supplementary brake operating device 32 has two predetermined braking positions.

The indexing mechanism 43 basically includes a cylindrical support body 44, an intermediate member 45 and a force applying member 46. The cylindrical support body 44 is fixed to the mounting part 40, and rotatably supports the winding member 41 and the operating member 42 on the handlebar 18. The intermediate member 45 is arranged and configured to rotate integrally with the operating member 42. The force applying member 46 (e.g., a Belleville spring) serves to load the intermediate member 45 toward the support body 44.

The intermediate member 45 is a generally circular disk shaped member called an idler. The intermediate member 45 is configured such that it can move freely in the axial direction along the support body 44. The intermediate member 45 is also configured such that the outer circumference thereof engages with the operating member 42. Thus, the intermediate member 45 rotates integrally with the operating member 42, but can move axially on the handlebar 18 with respect to the operating member 42. Ratchet teeth 45a of the intermediate member 45 engages with mating ratchet teeth 44a of the support body 44 such that the operating member 42 is positioned in one of three positions along the rotational direction with respect to the mounting part 40. The intermediate member 45 has an engagement protrusion 45b configured to engage with the winding member 41 in such a manner as to transfer turning (rotary) movement of the operating member 42 to the winding member 41 via the intermediate member 45.

The bicycle braking device 33 basically includes a caliper housing 50 and an actuation unit 51 that is movable relative to the caliper housing 50 in response to hydraulic fluid being forced between into the caliper housing 50 due to operation of the brake lever 32a. The actuation unit 51 is biased to the non-brake applying position with respect to the caliper housing 50, which is fixed to the frame 14. The actuation unit 51 includes a pair of brake pads for selectively gripping a disc brake rotor R in a conventional manner. Since hydraulic disc brakes are well known in the bicycle art, the bicycle braking device 33 will not be discussed in further detail.

Figure 5:
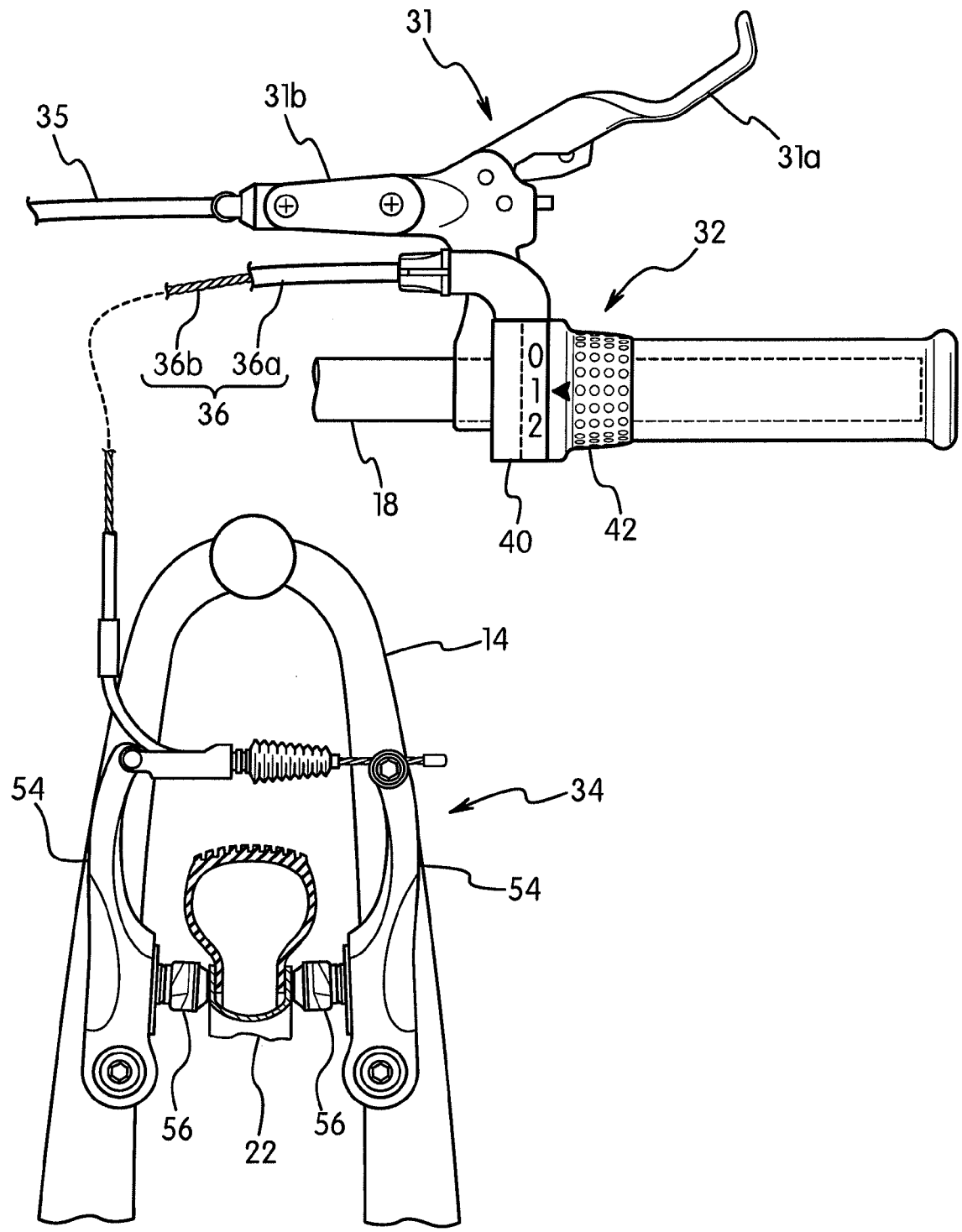
FIG. 5 is a diagrammatic view of the supplementary brake operating device in a first braking position so that the supplementary bicycle braking device is in a first brake applying position.
Figure 6:
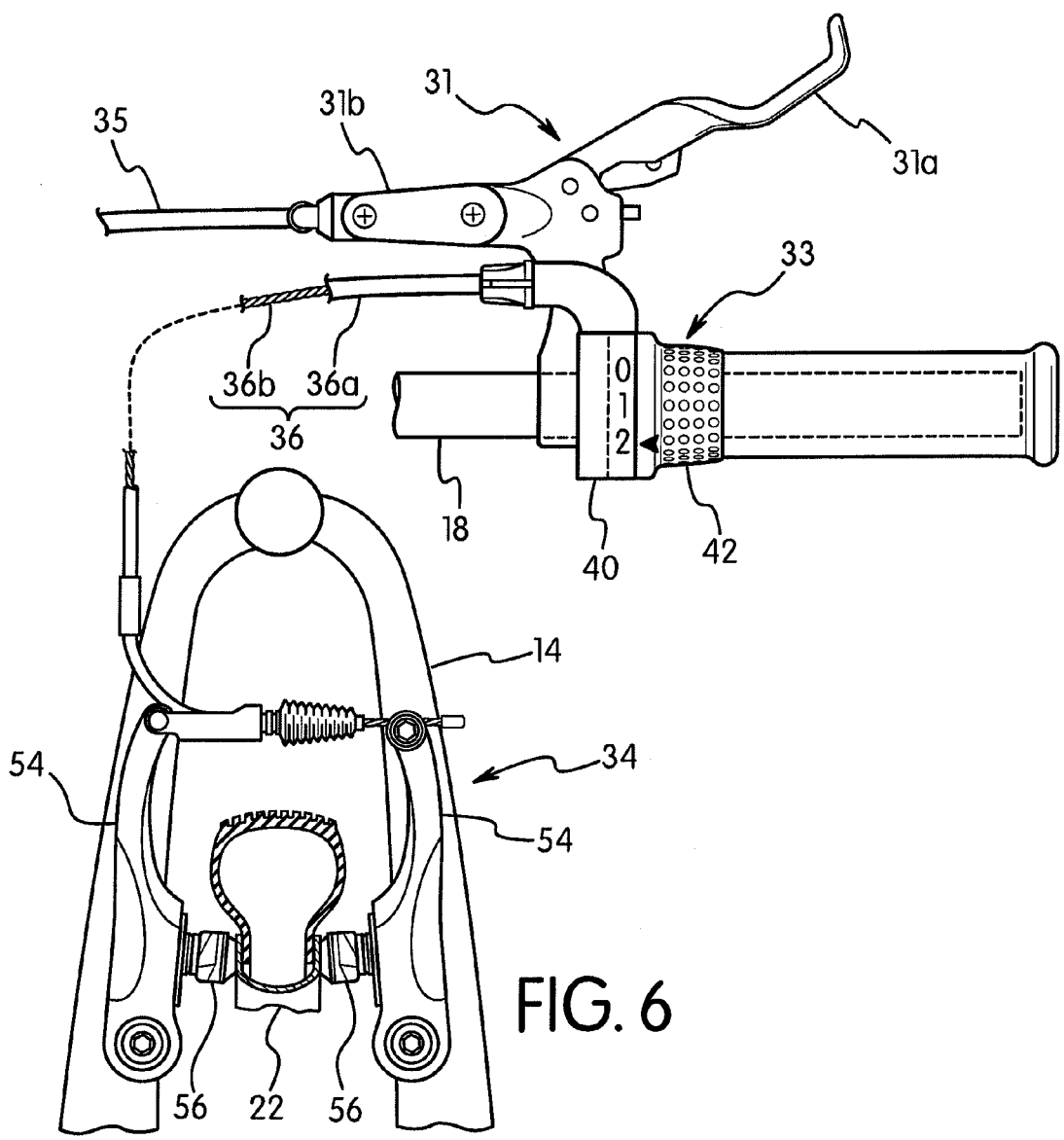
FIG. 6 is a diagrammatic view of the supplementary brake operating device in a second braking position so that the supplementary bicycle braking device is in a second brake applying position.

The supplementary bicycle braking device 34 is a conventional cantilever brake that is well known in the bicycle art. The supplementary bicycle braking device 34 has a pair of brake arms 54 pivotally mounted to the frame 14. The brake arms 54 are biased to non-brake applying positions. When the operating member 42 is twisted to one of the braking positions, as seen in FIGS. 5 and 6, the brake arms 54 are moved towards each other so that the brake pads 56 contact the rim of the rear wheel 22. Since cantilever brakes are well known in the bicycle art, the supplementary bicycle braking device 34 will not be discussed and/or illustrated in detail herein, for the sake of brevity.

Figure 8:
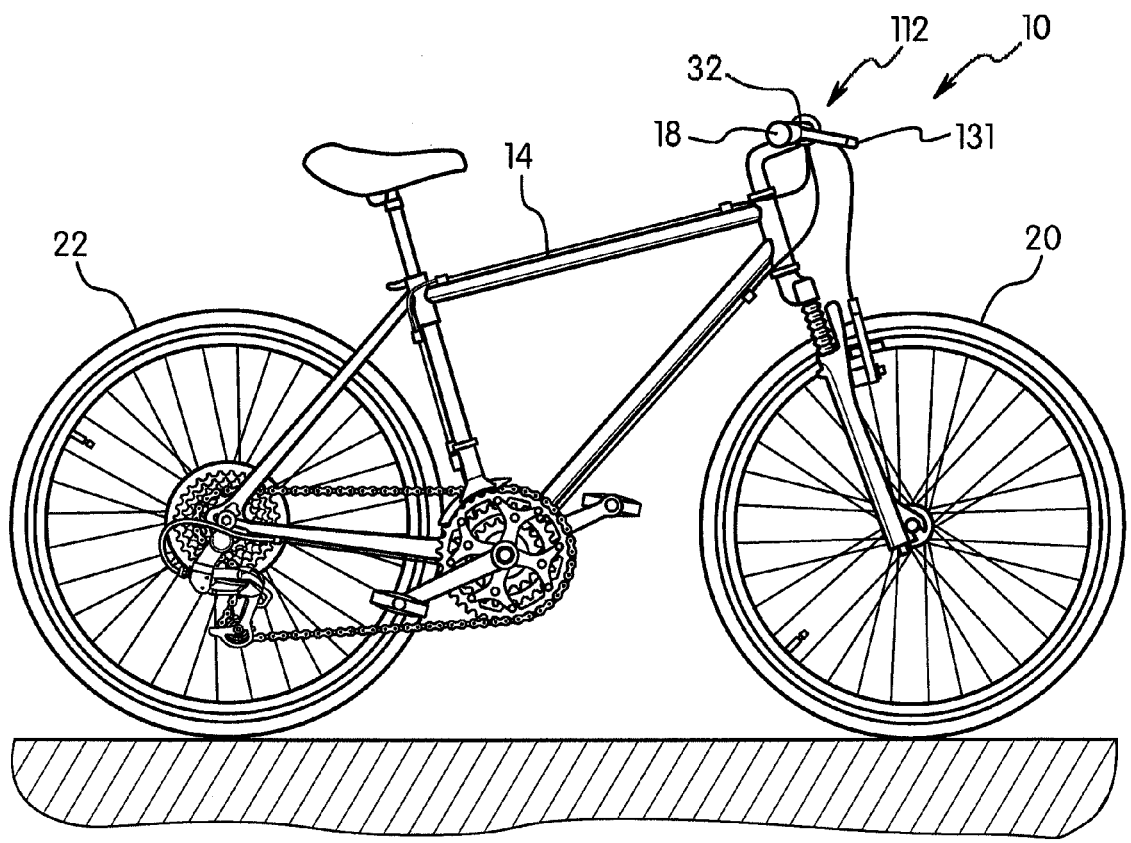
FIG. 8 is a side elevational view of a bicycle equipped with a bicycle braking system in accordance with a second embodiment.
Figure 9:
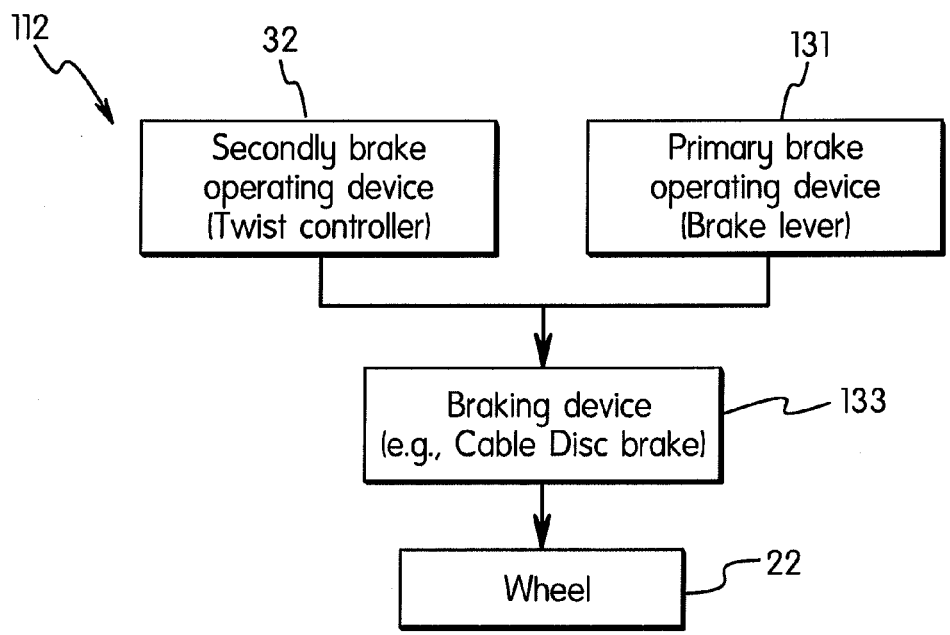
FIG. 9 is a block diagram of the bicycle braking system in accordance with the second embodiment.
Figure 10:
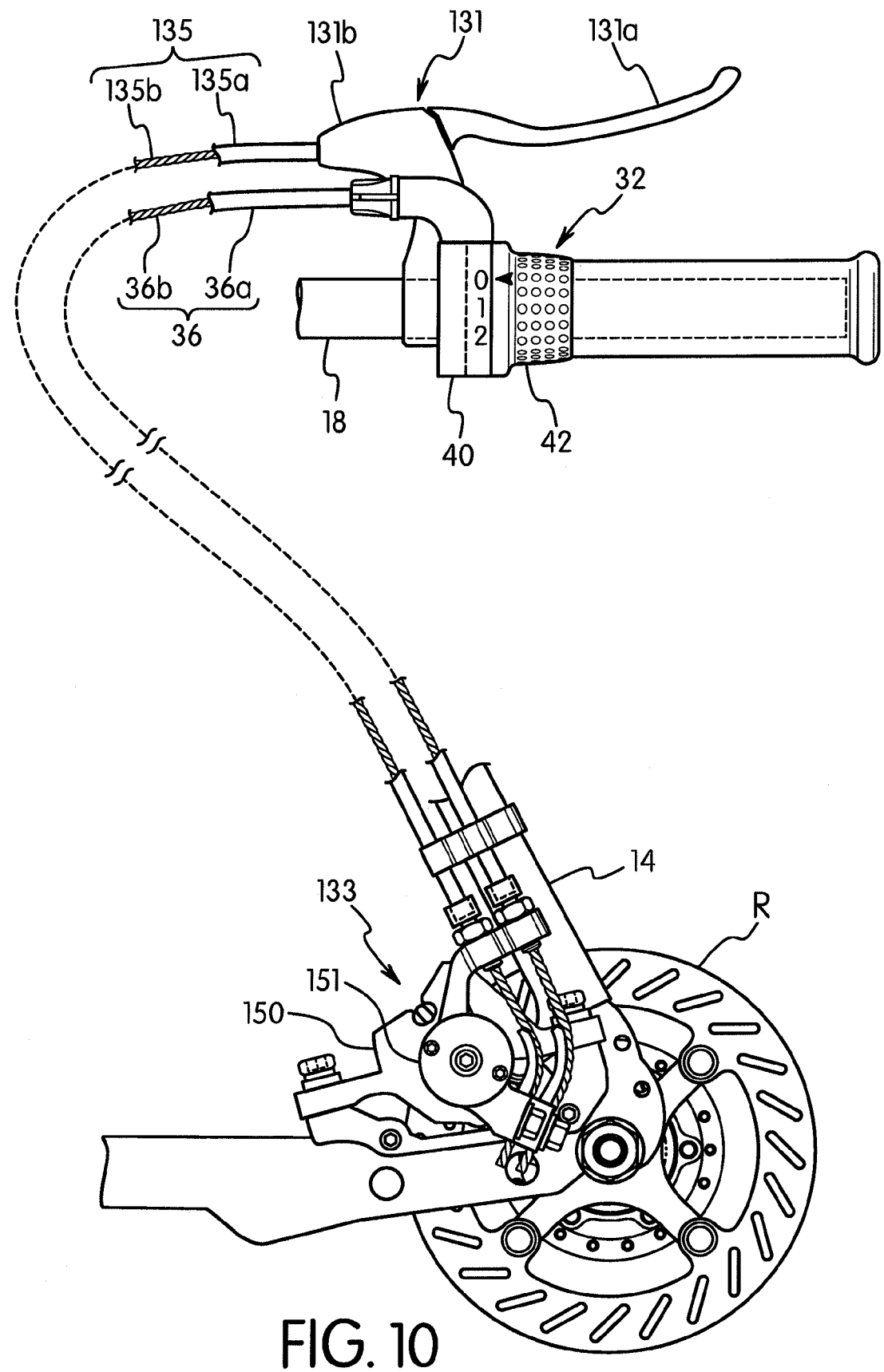
FIG. 10 is a diagrammatic view of the bicycle braking system in accordance with the second embodiment, showing the primary and supplementary brake operating devices in non-braking positions, and showing a common bicycle braking device a non-brake applying position.
Figure 11:
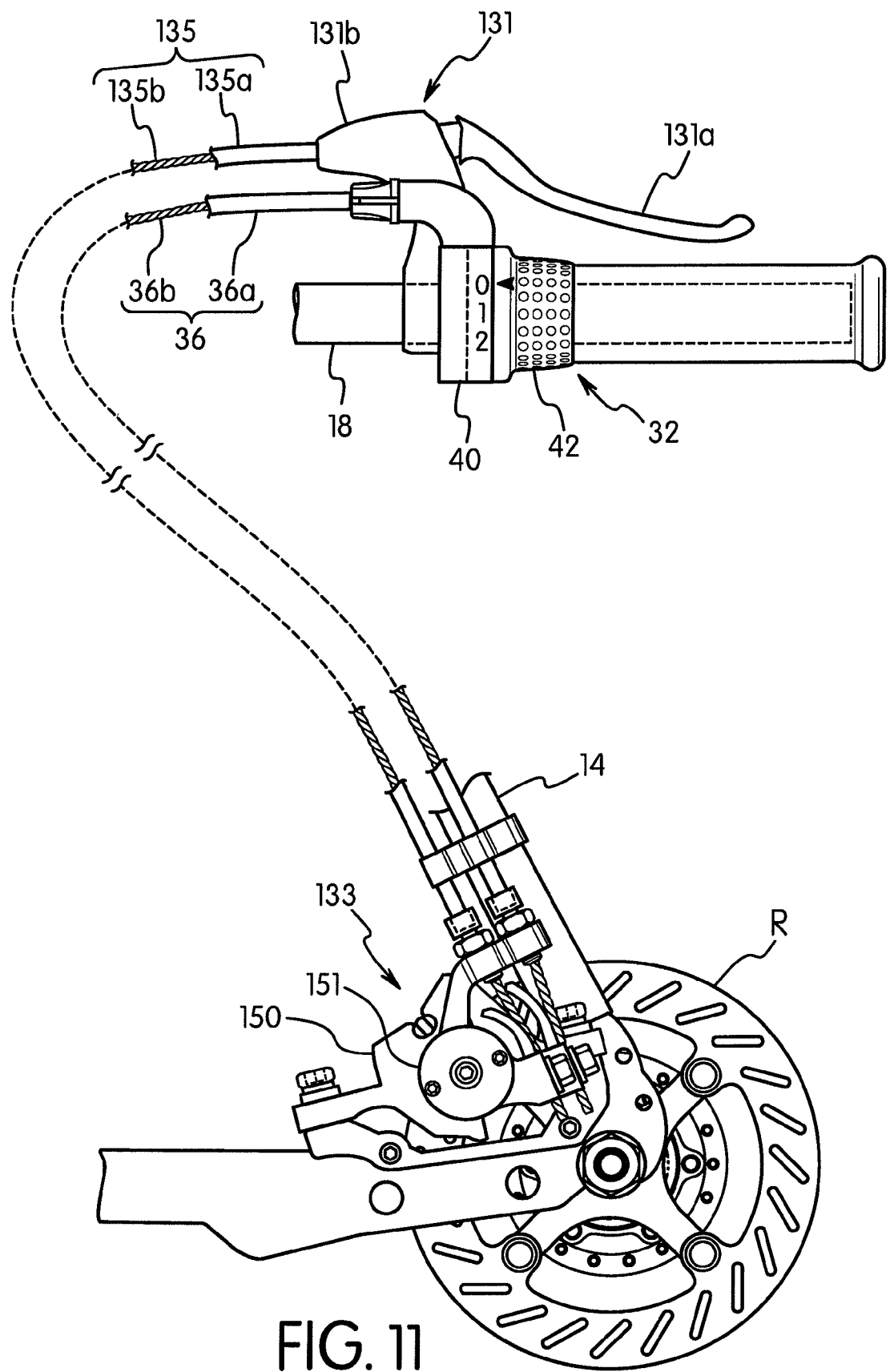
FIG. 11 is a diagrammatic view, similar to FIG. 10, of the bicycle braking system, but with the primary brake operating device in a braking position.
Figure 12:
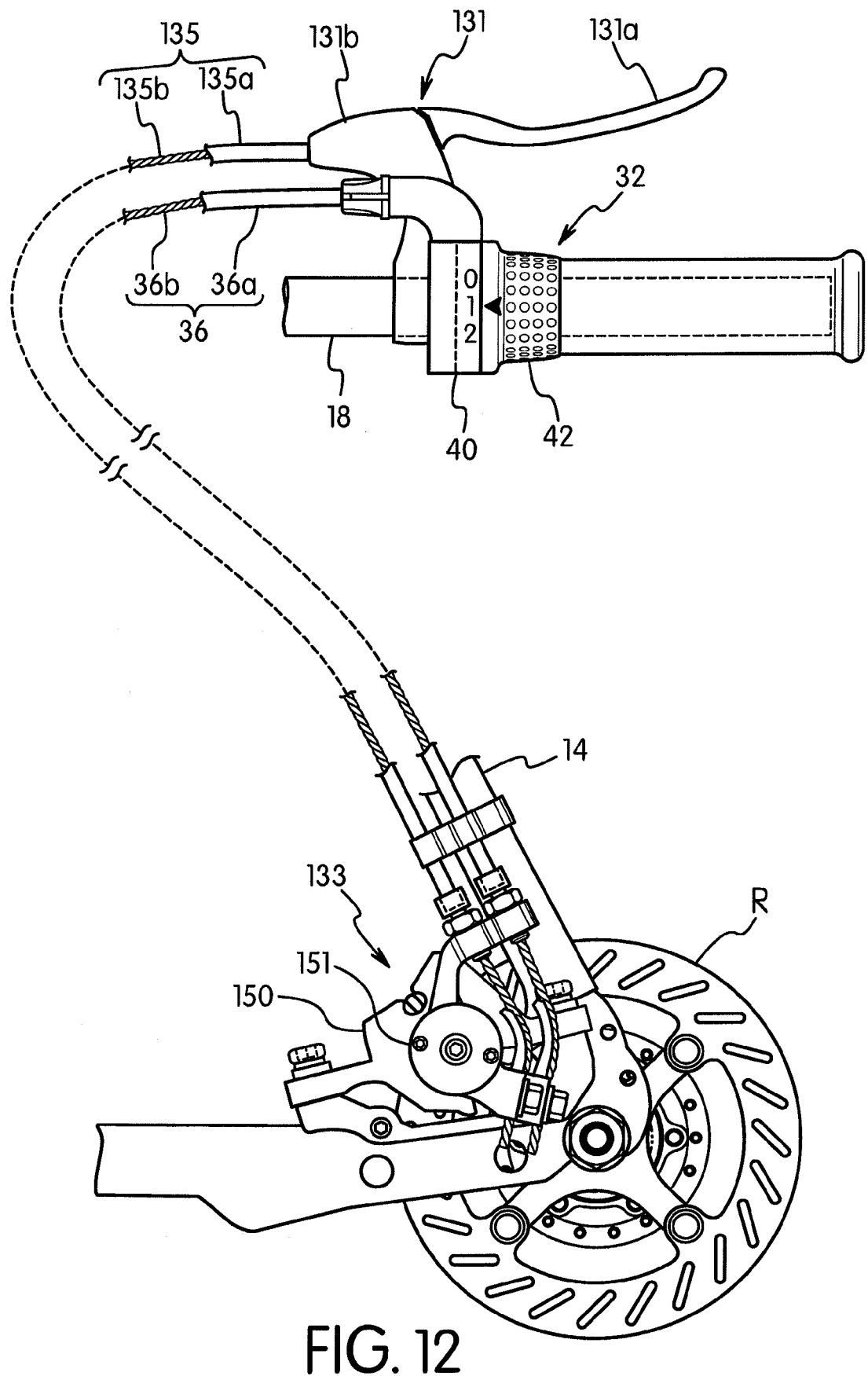
FIG. 12 is a diagrammatic view, similar to FIGS. 10 and 11, of the bicycle braking system, but with the supplementary brake operating device in a first braking position.
Figure 13:
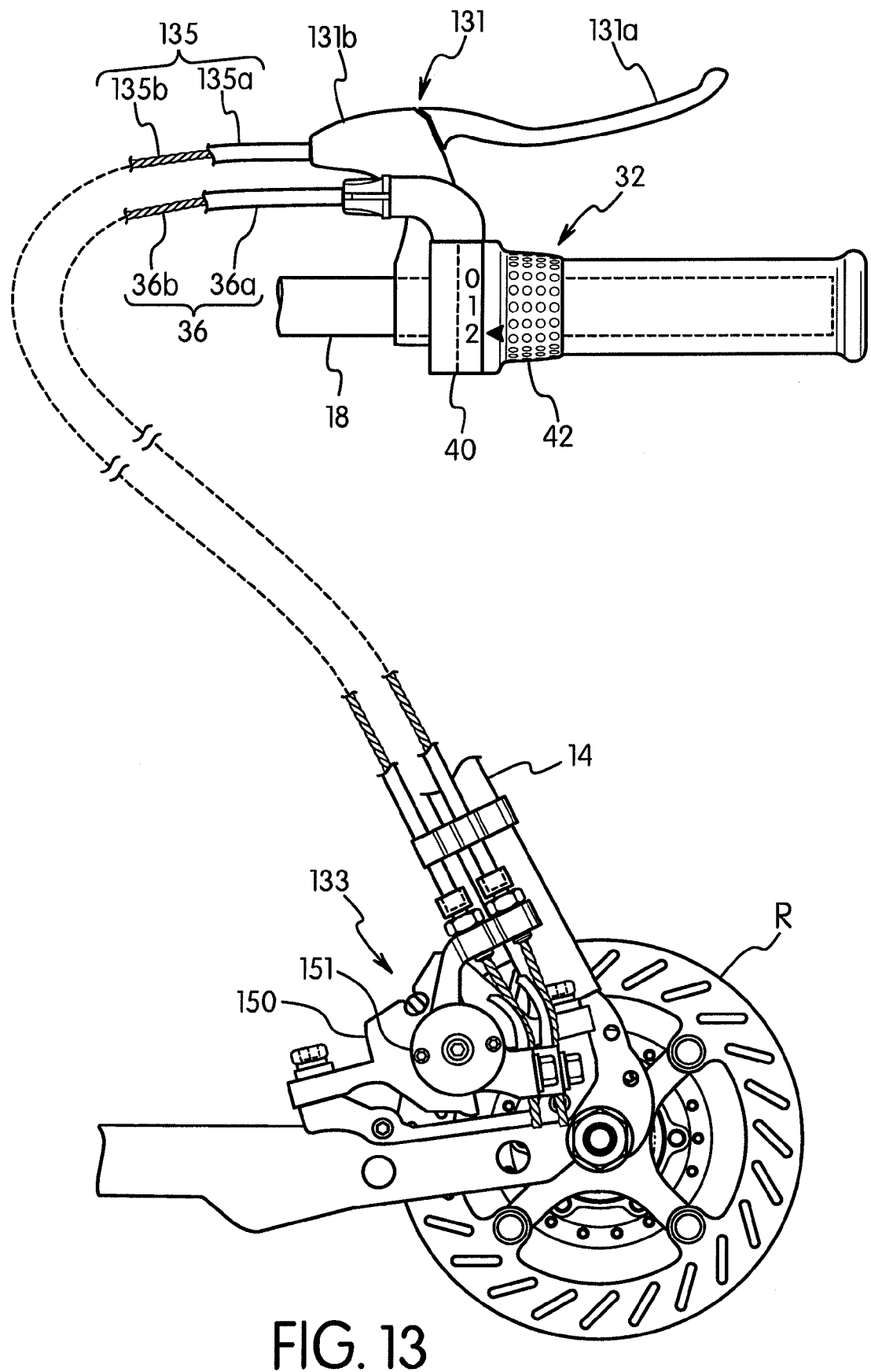
FIG. 13 is a diagrammatic view, similar to FIGS. 10 to 12, of the bicycle braking system, but with the supplementary brake operating device in a second braking position.

Referring now to FIGS. 8 to 13, a bicycle braking system 112 is illustrated in accordance with a second embodiment. This bicycle braking system 112 is mounted to the frame 14 of the bicycle 10 as seen in FIG. 8. In this illustrated embodiment, the bicycle braking system 112 basically comprises a primary brake operating device 131, the supplementary brake operating device 32 from the first embodiment, and a bicycle braking device 133. Here the bicycle braking device 133 operates as both the primary and supplementary bicycle braking devices. This bicycle braking system 112 is schematically illustrated in a block diagram in FIG. 9.

In other words, the primary brake operating device 131 and the supplementary brake operating device 32 are both operatively coupled to the bicycle braking device 133 to selectively move the bicycle braking device 133 between a non-brake applying position and a brake applying position for applying a braking force to the rear wheel 22. Of course, the bicycle braking device 133 can be arranged to apply a braking force to the front wheel 20 upon operation of the primary brake operating device 131 and/or the supplementary brake operating device 32.

In this illustrated embodiment, the primary brake operating device 131 is a cable operating device that includes a brake lever 131a that is pivotally mounted to a handlebar mounting portion 131b. The brake lever 131a is biased relative to the handlebar mounting portion 131b away from the handlebar 18 towards a non-braking applying position. When the brake lever 131a is pulled towards the handlebar 18, a brake applying position for apply a braking force. A primary brake cable 135 is operatively connected between the primary brake operating device 131 and the bicycle braking device 133. The primary brake cable 135 is a conventional Bowden control cable that has an outer casing 135a and an inner wire 135b that moves within the outer casing 135a to transmit a pulling force to the bicycle braking device 133 when the brake lever 131a is pulled towards the handlebar 18. Free ends of the inner wire 135b extend out from opposite ends of the outer casing 135a such that one end of the inner wire 135b is connected to the primary brake operating device 131 and the other end of the inner wire 135b is connected the bicycle braking device 133. In other words, the primary brake operating device 131 is operatively coupled to operate the bicycle braking device 133 by the primary brake cable 135 for apply the braking force based on an operation amount of the brake lever 131a of the bicycle braking device 133.

In this illustrated embodiment, the bicycle braking device 133 is a conventional cable operated disc brake. Both the primary brake operating device 131 and the supplementary brake operating device 32 are operatively coupled to operate the bicycle braking device 133. The bicycle braking device 133 is movably between a non-brake applying position and a brake applying position for applying a braking force in response to actuation of the primary brake operating device 131 or the supplementary brake operating device 32. Thus, the primary bicycle braking device 133 is a cable operated brake that is operatively coupled to the primary brake operating device 131 by the control cable 135 and operatively coupled to the supplementary brake operating device 32 by the control cable 136.

The bicycle braking device 133 basically includes a caliper housing 150 and an actuation unit 151 that is movable relative to the caliper housing 150 by the cables 135 and 136. The actuation unit 151 is biased to the non-brake applying position with respect to the caliper housing 150, which is fixed to the frame 14. The actuation unit 151 includes a pair of brake pads for selectively gripping a disc brake rotor R in a conventional manner. Since cable operated disc brake device are well known in the bicycle art, the bicycle braking device 133 will not be discussed in further detail.

Figure 7:
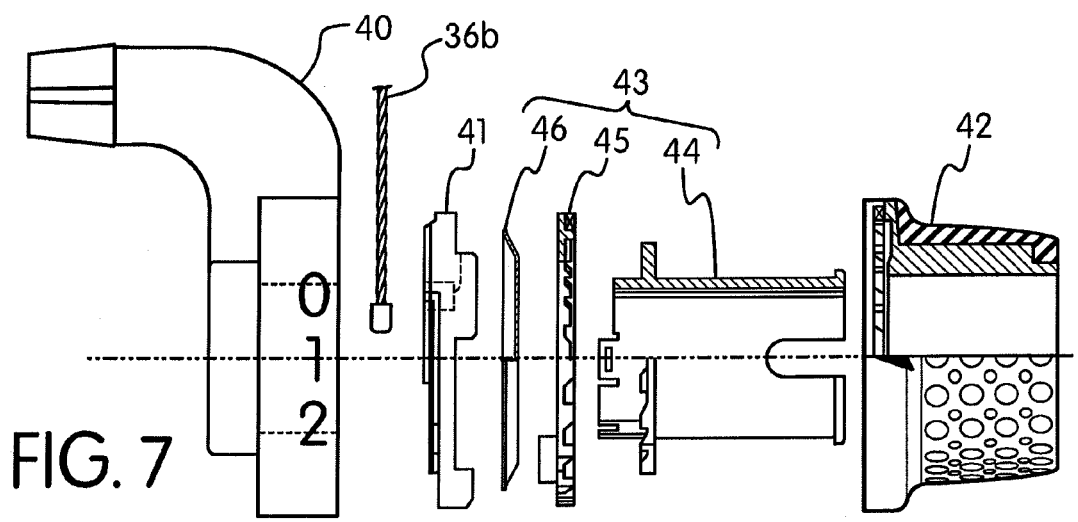
FIG. 7 is an exploded view of the supplementary brake operating device showing the main components of the supplementary brake operating device in partial cross section.

Basically, the primary brake operating device 131 only operates the bicycle braking device 133 so long as the rider holds a brake lever 131a of the primary brake operating device 131 in a braking applying or actuating position. Once the rider releases the brake lever 131a of the primary brake operating device 131, the bicycle braking device 133 releases the braking force applied device to the rear wheel 22. On the other hand, once the rider operates the supplementary brake operating device 32 from a non-braking position to one of the predetermined braking positions, the brake maintaining arrangement 43 (FIG. 7) holds the bicycle braking device 133 in the brake applying position for applying a braking force to the rear wheel 22.

Figure 14:
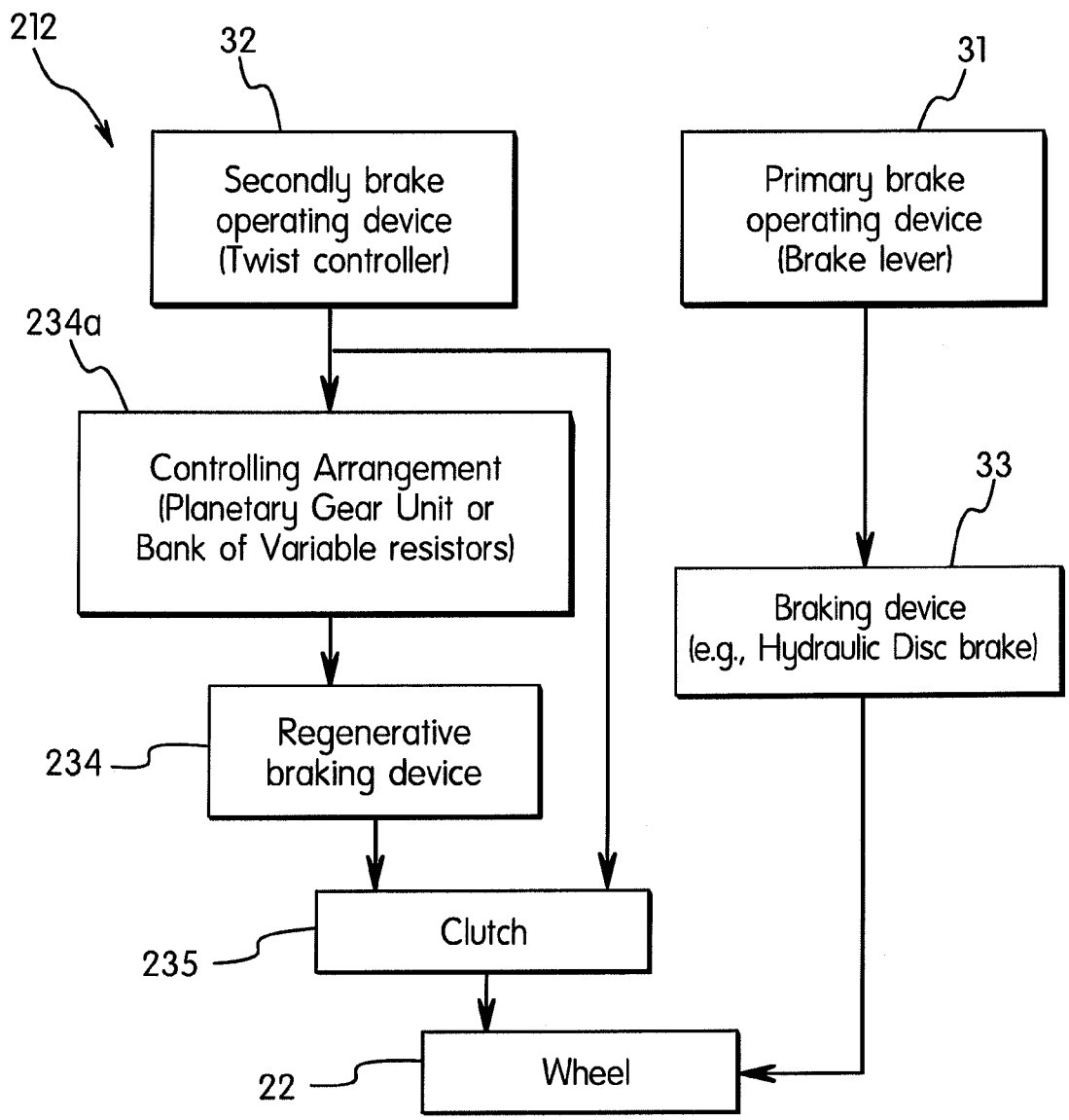
FIG. 14 is a block diagram of the bicycle braking system in accordance with a third embodiment.

Referring now to FIG. 14, a bicycle braking system 212 is illustrated in accordance with a third embodiment. In this illustrated embodiment, the bicycle braking system 212 basically comprises the primary and supplementary brake operating devices 31 and 32 of the first embodiment, a primary bicycle braking device 33 of the first embodiment and a supplementary bicycle braking device 234 in the form of a regenerative brake device. In other words, this embodiment only differs from the first embodiment in that the supplementary bicycle braking device 234 uses a regenerative brake device instead of a cantilever type brake to apply a braking force to the rear wheel 22. The regenerative brake device 234 can be an electric motor/generator mounted with in the rear hub of the rear wheel 22 with a clutch 235 disposed between the hub shell and the regenerative brake device 234. The clutch 235 is normally in a disengaged position (i.e., the supplementary brake operating device 32 is in the non-braking position) such that the regenerative brake device 234 is disconnected from the rear wheel 22. The clutch 235 is operatively coupled to a rotational shaft of the regenerative brake device 234 (e.g., the electric motor/generator) with the clutch 235 being operable by the supplementary brake operating device 132 between an engaged position and a disengaged position.

Here, operation of the supplementary brake operating device 32 operates both the regenerative brake device 234 and the clutch 235. Thus, when the supplementary brake operating device 32 is moved (rotated) from the non-braking position to one of the predetermined braking position, the inner wire 36b is pulled to engage the clutch 235. Engagement of the clutch 235 connects the regenerative brake device 234 to the rear wheel 22 so that rotation of the rear wheel 22 turns a rotor of the regenerative brake device 234. The regenerative brake device 234 is basically a generator that rotated by the rear wheel 22 when the clutch 235 is engaged to generate electricity that can be stored in an electrical storage device (e.g., a battery) in the bicycle. Thus, when the clutch 235 is engaged, the regenerative brake device 234 applies a braking force to the rear wheel 22 in response to movement of the operating member 42 (e.g., rider operating arrangement) of the supplementary brake operating device 32 to the braking position.

The regenerative brake device 234 can be controlled in at least two potential ways. As seen in FIG. 14, the regenerative brake device 234 is controlled by a controlling arrangement 234a that can be a planetary gear unit or a bank of variable resistors.

In the case of a planetary gear unit, a gear ratio of the controlling arrangement 234a is controlled by moving (rotating) the operating member 42 between the predetermined braking positions. Thus, the regenerative brake device 234 is a mechanism that reduces bicycle's speed by converting some of its kinetic energy into electrical energy. This captured electrical energy is then stored for future use or fed back into a power system of the bicycle 10.

In the case a bank of variable resistors, the resistance of the controlling arrangement 234a is controlled by moving (rotating) the operating member 42 between the predetermined braking positions. Thus, the regenerative brake device 234 is a mechanism that reduces bicycle's speed by dissipating the electric energy as heat by passing the current through large banks of variable resistors.

Figure 15:
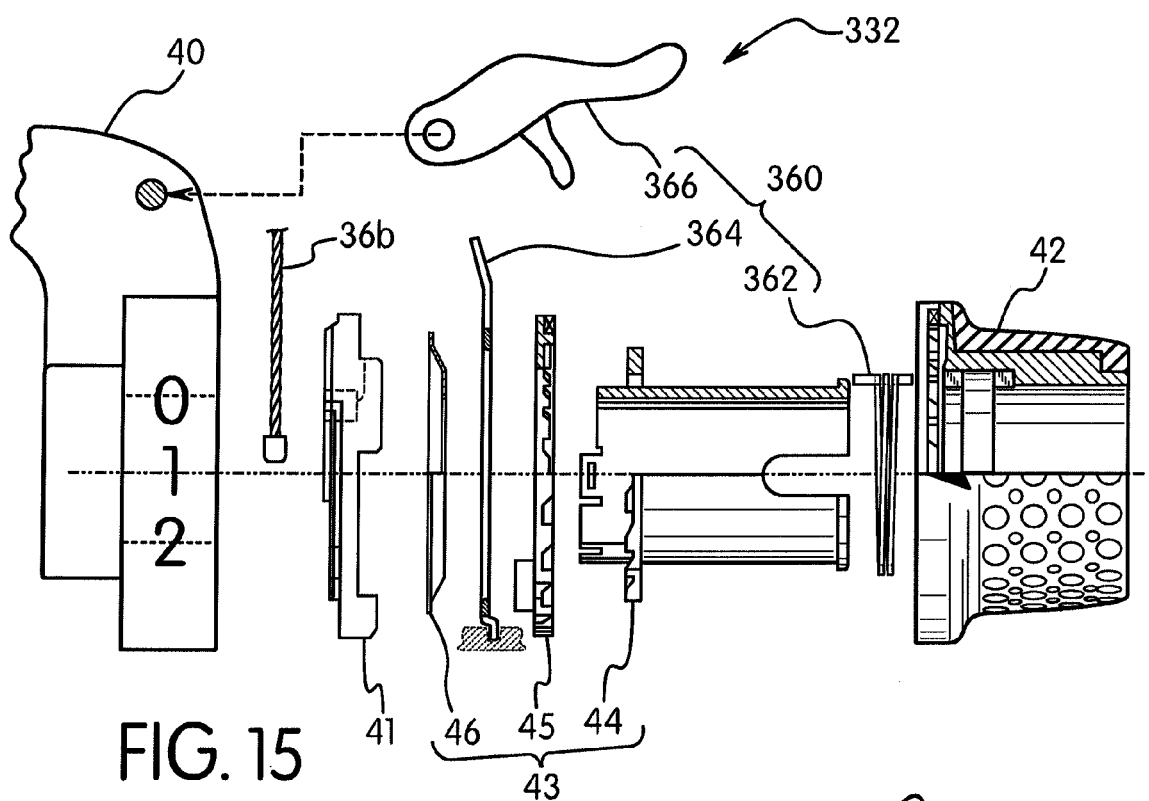
FIG. 15 is an alternative supplementary brake operating device that can be used in any one of the preceding embodiments.

Referring now to FIG. 15, an alternative supplementary brake operating device 332 is illustrated that can be used in any of the preceding embodiments. The supplementary brake operating device 332 is identical to the supplementary brake operating device 32, except a release mechanism 360 has been added to move compress the force applying member 46 so that the intermediate member 45 can move from a position maintain location to a position release location such that the operating member 42 moves freely from the braking position to the non-braking position.

The release mechanism 360 basically includes a biasing member 362, a compressing element 364 and a release lever 366. The biasing member 362 biases the operating member 42 towards the non-braking position, while the compressing element 364 and the release lever 366 are operatively arranged to compress the force applying member 46 so that the intermediate member 45 moves from the position maintain location to the position release location. In particular, the biasing member 362 is a torsion spring that has one end fixed to the support body 44 and the other end fixed to the operating member 42 to bias the operating member 42 towards the non-braking position.

When the force applying member 46 is compressed, the biasing member 362 urges the operating member 42 from the braking position to the non-braking position such that the intermediate member 45 is moves axially to the release position. When the operating member 42 is rotated from the non-braking position to any one of the braking positions, the indexing mechanism 43 maintains the winding member 41 and the operating member 42 in the selected one of the braking positions as mentioned above in the first embodiment. Thus, the winding member 41 pulls the inner wire 36b to operate the corresponding braking device to a brake applying position. Once in the winding member 41 and the operating member 42 are in one of the braking positions, the release lever 366 of the release mechanism 360 can be operated by the rider to return to the non-braking position. The release lever 366 constitutes a brake release operating device that is operatively coupled to the supplementary brake operating device 332 to release the brake maintaining arrangement from the selected one of the predetermined braking positions to the non-braking position in response to operation of the release lever 366. Thus, the rider can quickly return to the non-braking position from any one of the braking positions. In FIG. 15, the release lever (e.g., a brake release operating device) is adjacent (e.g., part of) the supplementary brake operating device 332.

Figure 16:
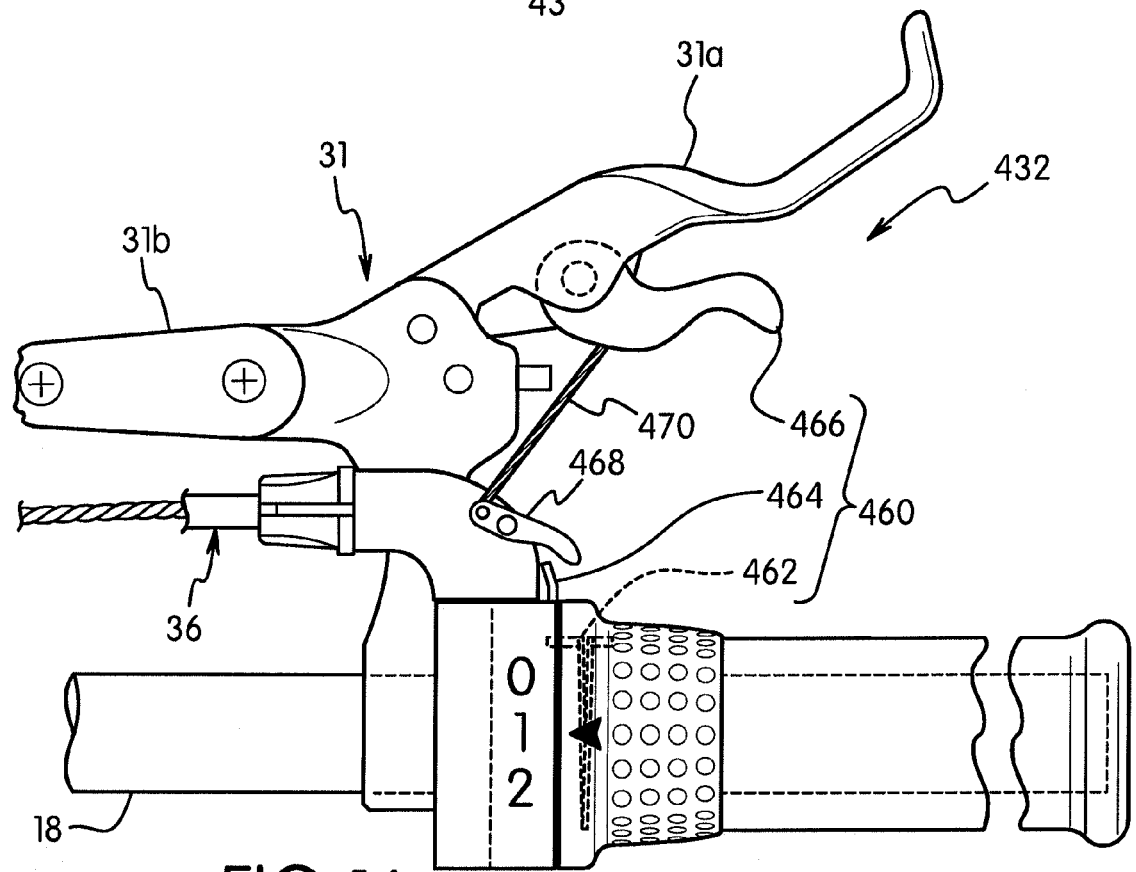
FIG. 16 is another alternative supplementary brake operating device that can be used in any one of the preceding embodiments.

Referring now to FIG. 16, another alternative supplementary brake operating device 432 is illustrated that can be used in any of the preceding embodiments. The supplementary brake operating device 432 is identical to the supplementary brake operating device 332, except that a release mechanism 460 replaces the release mechanism 360 of the third embodiment.

Basically, the release mechanism 460 includes a biasing member 462, a compressing element 464 and a release lever 466. The release mechanism 460 operates in the same manner as the third embodiment, except the release lever 466 does not directly contact the compressing element 464 in the embodiment. Thus, the biasing member 462 is the same as the biasing member 362 of the third embodiment, and biases the operating member 42 towards the non-braking position. The compressing element 464 is also the same as the compressing element 364 of the third embodiment. The release lever 466 indirectly compresses the compressing element 464 to release the operating member 42.

In particular, in this embodiment, the release lever 466 is remotely located from the supplementary brake operating device 432. The release lever 466 is coupled to a release transmitting element 468 by a cable 470. When the release lever 466 is pivoted, the cable 470 pivots die release transmitting element 468, which in turn moves the compressing element 464 to compress the force applying member 46 so that the intermediate member 45 is free to move from a position maintain location to a position release location under the force of the biasing member 462. In other words, depressing the release lever 466 results in the operating member 42 moving from one of the braking positions to the non-braking position. In this embodiment, the release lever 466 (e.g., a brake release operating device) is pivotally mounted on the brake lever 31a.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle braking system comprising:
    a bicycle braking device movably arranged on a bicycle frame between a non-brake applying position and a brake applying position for applying a braking force to a bicycle wheel;
    a supplementary brake operating device operatively coupled to operate the bicycle braking device, the supplementary brake operating device including a rider operating arrangement operable between a non-braking position and at least one predetermined braking position;
    a brake maintaining arrangement configured and arranged to hold the bicycle braking device in the brake applying position in response to movement of the rider operating arrangement to the predetermined braking position such that the braking force of the bicycle braking device is continually and consistently applied;
    a primary bicycle braking device movably arranged on the bicycle frame between a non-brake applying position and a brake applying position for apply a braking force to the bicycle wheel; and
    a primary brake operating device operatively coupled to operate the primary bicycle braking device for applying the braking force based on an operation amount of the primary brake operating device,
    the bicycle braking device and the primary bicycle braking device being arranged to be independently actuated such that the primary brake operating device remains unoperated in a non-braking position white the supplementary brake operating device is operated between the non-braking position and the at least one predetermined braking position.

2. The bicycle braking system as set forth in claim 1, further comprising
    a brake release operating device operatively coupled to the supplementary brake operating device to release the brake maintaining arrangement from the predetermined braking position to the non-braking position in response to operation of the brake release operating device.

3. The bicycle braking system as set forth in claim 2, wherein
    the brake release operating device is remotely located from the supplementary brake operating device.

4. The bicycle braking system as set forth in claim 2, wherein
    the brake release operating device is adjacent the supplementary brake operating device.

5. The bicycle braking system as set forth in claim 3, wherein
    the brake maintaining arrangement of the supplementary brake operating device has a plurality of the predetermined braking positions.

6. The bicycle braking system as set forth in claim 3, wherein
    the bicycle braking device includes a cable operated brake that is operatively coupled to the supplementary brake operating device by a control cable.

7. The bicycle braking system as set forth in claim 1, wherein
    the bicycle braking device includes an electric motor, generator that is configured to apply the braking force in response to movement of the rider operating arrangement to the braking position.

8. The bicycle braking system as set forth in claim 7, further comprising
    a clutch operatively coupled to a rotational shaft of the electric motor/generator with the clutch being operable by the supplementary brake operating device between an engaged position and a disengaged position.

9. The bicycle braking system as set forth in claim 1, wherein
    the at least one predetermined braking position of the rider operating arrangement includes a plurality of predetermined braking positions with corresponding different braking force amounts.

10. The bicycle braking system as set forth in claim 1, wherein the at least one predetermined braking position of the rider operating arrangement includes a plurality of predetermined braking positions which are spaced apart circumferentially about a handlebar mounting axis of the handlebar.

11. The bicycle braking system as set forth in claim 10, wherein the rider operating arrangement includes a force applying member which locks the rider operating arrangement in each of the plurality of predetermined operating positions, the force applying member being biased in an axial direction of the handlebar mounting axis.

12. The bicycle braking system as set forth in claim 1, wherein the brake applying position of the bicycle braking device includes a plurality of bra applying positions held by the brake maintaining arrangement, and rotation of the rider operating arrangement actuates the brake maintaining arrangement to hold the bicycle braking device in one of the non-brake applying position and the plurality of brake applying positions.

* * * * *